Nov. 27, 1934.    W. M. PERRY    1,982,319
REPLACEABLE TUBE HOLDER
Filed Dec. 4, 1931
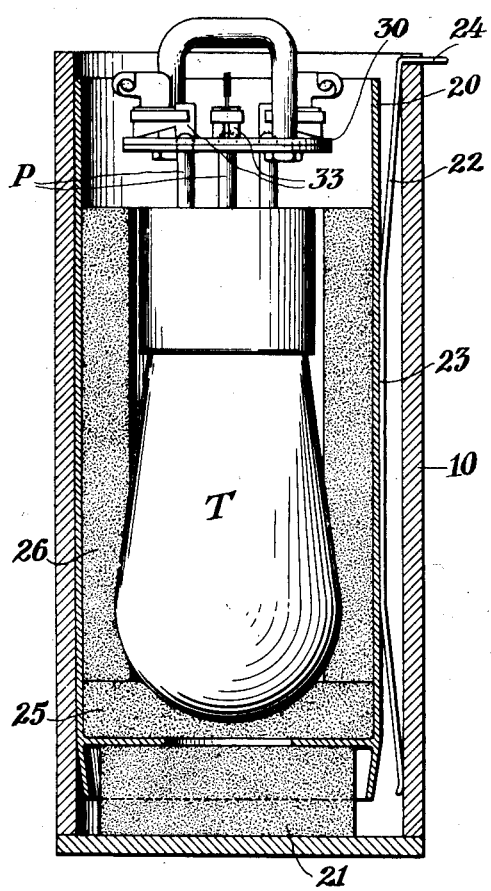
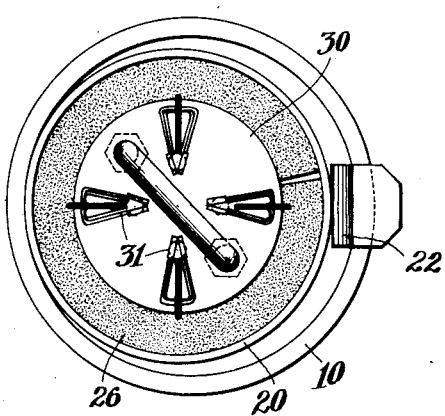
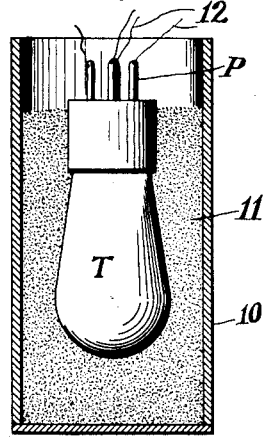
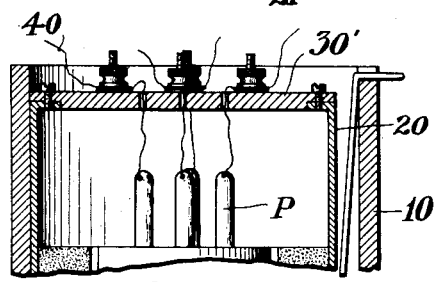
INVENTOR
Walter M. Perry
BY
Joseph H. Lifschutz
ATTORNEY Patented Nov. 27, 1934

1,982,319

UNITED STATES PATENT OFFICE 1,982,319

REPLACEABLE TUBE HOLDER

Walter M. Perry, Brooklyn, N. Y., assignor to Sperry Products, Inc., Brooklyn, N. Y., a corporation of New York Application December 4, 1931, Serial No. 579,061

6 Claims. (Cl. 250—27.5)

This invention relates to a means for transporting and utilizing thermionic tubes which are subjected to severe vibration. More particularly, the invention is adapted to be applied to the tubes utilized in the amplifying set of a Sperry rail flaw detector car where small electromotive forces picked up by the detector mechanism closely adjacent the rail are amplified by the amplifying set in the car. These tubes are, as a consequence, subjected to great vibration and therefore they have heretofore been mounted within protective casings from the walls of which they have been insulated by resilient means, such as soft sponge rubber. The tubes have been mounted in inverted position with the prongs extending upwardly so that the conductor leads could be soldered thereto.

The operation of replacing the tube consumed a lot of time and caused considerable delay in the operation of the car, and therefore the present invention has for its principal object the provision of a tube carrier such that a quick change of tubes may be effected in service.

Further details of this invention will become apparent in the following detailed description thereof.

In the accompanying drawing,

Fig. 1 is a vertical section through a tube mounting embodying my invention.

Fig. 2 is a plan view of the Fig. 1 device.

Fig. 3 is a view similar to Fig. 1, with parts broken away, of another form of my invention.

Fig. 4 is a vertical section through a mounting or carrier of the old type which this invention is designed to replace.

Referring first to Fig. 4, there is disclosed the old method of mounting detector tubes for the purpose hereinbefore described. In order to avoid the effects of vibration, the tube was mounted within a casing 10 which also performed the function of a magnetic shield, and the tube T was supported within said casing in inverted position in a bed of resilient material 11, which was usually sponge rubber. The conductor leads 12 were soldered to the ends of prongs P. From this description of the old type of tube mounting it can readily be appreciated that there was considerable work and substantial delay whenever a tube had to be changed. Thus, the leads 12 had to be disconnected from the prongs P, the sponge rubber taken out, a new tube T inserted, the sponge rubber packed around said tube between said tube and the walls of the casing, and then the leads 12 again soldered to the prongs P. This sometimes resulted in the tube T being displaced within the casing 10 so that the tube was closer to one side of the casing than the other side.

In order to avoid the delay and the operations described above, I have devised the form shown in Figs. 1 and 2 which permits a change of tube to be made within a few seconds of time, and at the same time insures proper mounting of the tube within the casing. For this purpose I do not pack the tube within the casing 10 that acts as a magnetic shield, but provide an auxiliary casing 20 of lesser diameter than the interior of casing 10, so that said inner casing may be readily inserted into and withdrawn from the outer casing. The inner casing is supplied from the factory with tube already mounted and packed therein, as hereinafter described. The inner casing, when inserted in position within the outer casing 10, may be caused to rest upon a resilient mat 21 in the bottom of casing 10 and may be locked within said casing by means of spring member 22 having an offset portion 23 designed to wedge inner casing 20 in position within the outer casing 10. Spring member 22 may be provided with a finger piece 24 which projects from the top of casing 10 so that it may easily be grasped for withdrawal of the spring member 22. As soon as said spring member 22 is withdrawn, the inner casing or tube holder may readily be withdrawn.

The inner casing or tube holder 20 may have a resilient mat 25 in the base thereof and a strip or pad of resilient material 26 wrapped around the tube T to form a resilient cushion between the tube and the walls of the inner casing. Since the layer 26 of resilient material is of uniform thickness the symmetrical positioning of the tube is insured. Instead of soldering the leads 12 to the ends of the tube prongs P, I may provide a connector 30 having the leads 12 permanently connected thereto at connections 31, said connector having tubular sockets 33 designed to fit over the prongs of tube T. It is therefore not necessary to stop for the purpose of soldering or making other connections of the leads to the prongs, but the mere positioning of connector 30 over the prongs immediately establishes all of the desired connections. The sockets 33 fit closely enough on the prongs P to insure good electrical contact.

In a modified form of the invention shown in Fig. 3, the connector 30' may be fixed on the upper end of casing 20 in any suitable manner, and the leads between the terminal blocks and the tube prongs may be soldered to form firm connections. When a tube is to be replaced, it is then only necessary to replace casing 20 and connect the outside leads 40 to the terminal blocks.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, an outer casing, an inner casing of lesser diameter than the inside of said first casing, to be readily removable therefrom, said inner casing being adapted to support a thermionic tube, and resilient spacing means interposed between said casings.

2. In a device of the character described, an outer casing, an inner casing of lesser diameter than the inside of said first casing, to be readily removable therefrom, said inner casing being adapted to support a thermionic tube, and a spring means interposed between said casings for locking said inner casing in position.

3. In a device of the character described, an outer casing, an inner casing of lesser diameter than the inside of said first casing, to be readily removable therefrom, said inner casing being adapted to support a thermionic tube, and a removable spring means interposed between said casings for locking said inner casing in position, said last named means having a finger portion extending out of said first casing.

4. In a device of the character described, an outer casing, an inner casing of lesser diameter than the inside of said first casing, to be readily removable therefrom, said inner casing being adapted to support a thermionic tube, and resilient means interposed between said casings, said means including a removable spring means between said casings for locking said inner casing in position.

5. In a device of the character described, an outer casing, an inner casing of lesser diameter than the inside of said first casing, to be readily removable therefrom, means for locking said casings together, said inner casing being adapted to have a thermionic tube packed therein in inverted position, resilient means interposed between said casings, and a member having means adapted for engaging the prongs of the tube and having electrical conductors attached thereto.

6. In a device of the character described, an outer casing and an inner casing of lesser diameter than the inside of said first casing, to be readily removable therefrom, said inner casing being adapted to support a thermionic tube and having resilient packing means adapted to be interposed between the tube and the casing, and resilient means interposed between said inner and outer casings.

WALTER M. PERRY.